Figure 1:
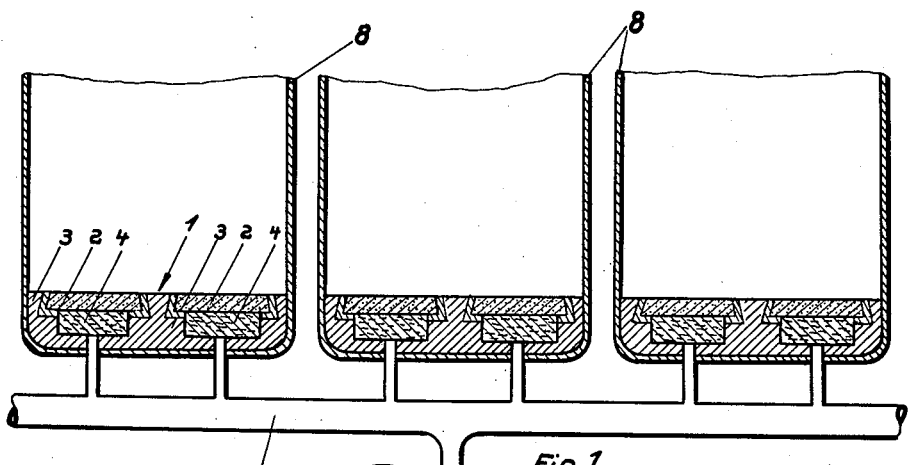

Jan. 15, 1963 C. LEIMEGGER 3,073,651
PNEUMATIC FLOORS FOR CONTAINERS AND TROUGHS
Filed June 8, 1960

INVENTOR
Carlo Leimegger

BY

United States Patent Office 3,073,651
Patented Jan. 15, 1963

3,073,651
PNEUMATIC FLOORS FOR CONTAINERS
AND TROUGHS
Carlo Leimegger, Neubeckum, Germany, assignor to
Polysius G.m.b.H., Neubeckum, Germany
Filed June 8, 1960, Ser. No. 34,809
Claims priority, application Germany Aug. 17, 1959
4 Claims. (Cl. 302—29)

The present invention relates to pneumatic floors of containers or troughs. The floors of containers or troughs as used for instance for storing, mixing, or conveying granular or pulverous material, generally consists of boxes in which aerating air is forced through porous plates into said granular or pulverous material.

When storing such materials in silos, the stored material will in conformity with the extent to which such silos are filled exert a rather high pressure upon the porous plates in said silos, which plates may consist for instance of ceramic stones or sintered metal. Small faults in the material of the plates may lead to fractures or the development of cracks, especially under the rough handling customary in this connection. If such cracks or tears occur, the handled material will be able to enter the aerating boxes and completely clog up said porous plates from below. Since usually a plurality of containers are connected to one and the same aerating system, the loosened material will by the compressed air be carried into every aeration duct and will in a very short time clog up and block the porous plates of the bottoms of the adjacent containers.

Also in troughs and containers with pneumatic floors, such fractures frequently occur as a result of shocks or impacts.

Inasmuch as soiled or clogged-up porous elements cannot be cleaned, and since the withdrawal of such containers or troughs for purposes of repair involves considerable expenses, it will be evident that the overall damage under such conditions may be very considerable.

In an effort to overcome these drawbacks, it has been suggested to provide the aerating ducts with check valves or one-way flaps. However, experience has shown that the pressure conditions prevailing in such ducts are not conducive to the reliable functioning of such flaps or valves.

According to another suggestion, in an effort to overcome the above mentioned drawbacks, a fine mesh screen or a coarse woven cloth has been suspended underneath the porous plates. While such an arrangement prevents fragments from broken plates from dropping to places where they might cause a harmful effect, the said arrangement cannot prevent the occurrence of tears in said screen or cloth through which tears the material will be able to enter the aeration system and block the same. This is especially so when pulverous material, particularly cement, is to be conveyed.

It is, therefore, an object of the present invention to provide pneumatic floors of containers or troughs which will overcome the above mentioned drawbacks.

It is another object of this invention to provide pneumatic floors of containers or troughs which will guard the aerating system also against the entry of pulverous material being processed.

These and other objects and advantages of the invention will appear more clearly from the following specification in connection with the accompanying drawing illustrating a cross section through an aeration box according to the invention.

The aeration box according to the present invention is characterized primarily in that the aeration box underneath the porous plate is completely filled with a long staple fibrous or sponge-like material as for instance glass wool, mineral wool, synthetic fiber or textile fiber compressed to form a mat, or an air permeable plastic sponge. The plastic material for such sponge may consist for instance of natural sponge or deformable rubber sponge.

In order to prevent the compressed air from forcing the mat upwardly and forming a cavity beneath said mat, which cavity might over a certain time be filled with the handled material if one of the porous plates should break whereby the other porous plates would be clogged up or blocked, the mat according to the present invention is advantageously affixed to the side walls and the bottom of the aeration box, preferably by an adhesive. In this way, if a fracture should occur in one of the porous plates, the mat will be compressed by the pressure of the material or stock above the same to such an extent that the fracture will be automatically isolated and the material being handled will thus be prevented from entering the air ducts. Numerous tests have shown that even a pulverous material will not penetrate the thus compressed fiber material. The additional resistance created by the insertion of the mat according to the present invention amounts to a fraction of 1% only of the pressure needed for the aerating air so that the increase in the resistance in the aerating duct or path of the container is irrelevant for all practical purposes.

Figure 2:
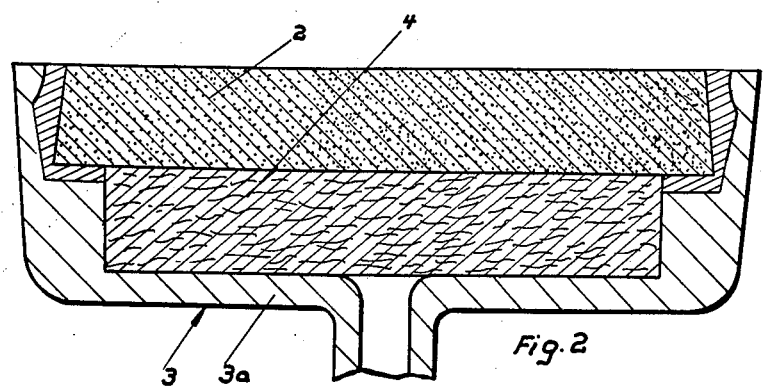

For a better understanding of the invention, reference may be made to the accompanying drawing in which:

FIGURE 1 shows a scheme in sectional view of several containers 8 provided with pneumatic floors 1; the individual aerating boxes 3 of these containers to be fitted with the mat 4 according to the present invention and to be fed with aeration air by means of a common pipe system 5 from a blower 6, FIGURE 2 represents a sectional view of an aerating box fitted with the mat according to the present invention.

The aerating box 3 shown in FIGURE 2 may for instance be of cast iron. The upper portion of the aerating box 3 is covered by a porous plate 2. The cavity confined between the floor 3a of the box 3 and plate 2 functions as an air storage chamber for the aeration process and is filled with a long staple fiber glass wool or sponge-like material forming a mat 4. Advantageously, the said mat 4 is adhesively secured to the floor and side walls of the aerating box 3. As adhesive for the purpose involved in the present case various materials may be used such as adhesive of synthetic material, animal adhesives, caoutchouc adhesives and cellulose adhesives. Between the aerating box 3 and that portion of the porous element 2 which protrudes beyond mat 4 there is provided a layer 7 which may consist of rubber or caoutchouc and has the purpose of sealing the aerating box against the contents of the container.

It is, of course, to be understood that the present invention is, by no means, limited to the particular construction shown in the drawing but also comprises any modifications within the scope of the appended claims.

What I claim is:

1. In combination; a container, a trough at the bottom of the container forming part of an aeration system and having a bottom with intake opening means therein: substantially rigid porous means supported by said container and arranged therein in spaced relationship to said trough bottom so as to define a closed cavity therewith, and a body of resilient air permeable material arranged in said cavity and interposed between and completely filling the space between said porous means and said trough bottom and extending over said opening means.

2. In combination; a container, a trough connected to the bottom of said container and forming part of an aeration system and having a bottom with intake opening means therein: substantially rigid porous means supported in said container and arranged therein in spaced relationship to and above said trough bottom so as to define a closed cavity therewith, and a body of resilient air permeable material compacted into mat form and interposed between said porous means and said trough bottom and completely filling the said cavity and extending over said opening means.

3. The combination according to claim 1, which includes means firmly connecting said body of resilient air permeable material to said trough bottom.

4. In combination; a container, the lower portion of the container being in the form of a trough forming part of an aeration system, said trough having a bottom with intake opening means therein: a rigid porous plate fixedly and sealingly supported at its side edges by said container and arranged in said container in spaced relation to the said bottom, and a mat of resilient air permeable material between the bottom of said plate and said bottom and completely filling the space therebetween, said mat being adhesively connected to said bottom of the trough to prevent air flowing into said inlet opening means from said intake opening means from compressing the said mat against the said plate.

References Cited in the file of this patent

UNITED STATES PATENTS

| | | |
|---|---|---|
| 1,759,983 | Houston | May 27, 1930 |
| 2,448,745 | Struckmann | Sept. 7, 1948 |
| 2,565,835 | Adams | Aug. 28, 1951 |
| 2,676,851 | Sylvest | Apr. 27, 1954 |

FOREIGN PATENTS

| | | |
|---|---|---|
| 704,981 | Great Britain | Mar. 3, 1954 |
| 304,228 | Switzerland | Mar. 1, 1955 |